(12) United States Patent
Ouchi et al.

(10) Patent No.: US 11,671,544 B2
(45) Date of Patent: Jun. 6, 2023

(54) IMAGE READING APPARATUS, IMAGE FORMING APPARATUS, AND DOCUMENT SIZE DETECTION METHOD

(71) Applicant: KYOCERA Document Solutions Inc., Osaka (JP)

(72) Inventors: Kei Ouchi, Osaka (JP); Ryotaro Todokoro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/154,064

(22) Filed: Jan. 21, 2021

(65) Prior Publication Data

US 2021/0234981 A1    Jul. 29, 2021

(30) Foreign Application Priority Data

Jan. 24, 2020    (JP) .............................. JP2020-009742

(51) Int. Cl.
*H04N 1/04*    (2006.01)
*H04N 1/00*    (2006.01)
*H04N 1/48*    (2006.01)
*H04N 1/028*    (2006.01)

(52) U.S. Cl.
CPC ...... *H04N 1/00708* (2013.01); *H04N 1/00734* (2013.01); *H04N 1/02815* (2013.01); *H04N 1/484* (2013.01)

(58) Field of Classification Search
None
See application file for complete search history.

(56) References Cited

U.S. PATENT DOCUMENTS

2016/0150109 A1* 5/2016 Matsui ............... H04N 1/00737
358/1.13
2019/0394349 A1* 12/2019 Nakao ................ H04N 1/00323

FOREIGN PATENT DOCUMENTS

JP    H09-135330    5/1997

* cited by examiner

*Primary Examiner* — Cheukfan Lee
(74) *Attorney, Agent, or Firm* — Lex IP Meister, PLLC (57) ABSTRACT

An image reading apparatus is provided with: a reading processing unit which moves a reading unit, causes a light emitting unit to emit a first amount of light, reads an electric charge generated by a photoelectric conversion unit, and reads an image of a document placed on a document placing surface on the basis of the read electric charge; and a detection processing unit which causes a light emitting unit to emit a second amount of light greater than the first amount of light, reads an electric charge generated by the photoelectric conversion unit, and detects the size of the document placed on the document placing surface on the basis of the read electric charge.

4 Claims, 7 Drawing Sheets

IMAGE READING APPARATUS, IMAGE FORMING APPARATUS, AND DOCUMENT SIZE DETECTION METHOD

INCORPORATION BY REFERENCE

This application is based upon and claims the benefit of priority from the corresponding Japanese Patent Application No. 2020-009742 filed on Jan. 24, 2020, the entire contents of which are incorporated herein by reference.

BACKGROUND

The present disclosure relates to an image reading apparatus, an image forming apparatus including the image reading apparatus, and a document size detecting method.

An image reading apparatus capable of detecting the size of a document placed on a light transmitting member such as a contact glass is known. Specifically, in this type of image reading apparatus, an image is read from the document placed on the light transmitting member just before the document cover is closed, and the size of the document is detected based on the read image.

When an image for size detection is read from the document placed on the light transmitting member, ambient light such as sunlight or electric lamp light may enter an image sensor. In this case, the boundary between the document area and the exposed area not covered by the document becomes unclear in the read image, and the detection accuracy of the document size in the image reading apparatus may decrease.

SUMMARY

An image reading apparatus according to one aspect of the present disclosure is provided with a light transmitting member, a light emitting unit, a photoelectric conversion unit, a reading processing unit, and a detection processing unit. The light transmitting member has a document placing surface on which a document is placed. The light emitting unit is provided so as to be movable along the document placing surface on the lower side of the light transmitting member, and emits light to the document placed on the document placing surface. The photoelectric conversion unit is provided so as to be capable of receiving light emitted from the light emitting unit and reflected from the document placed on the document placing surface, and generates an electric charge corresponding to the received light. The reading processing unit moves the light emitting unit, reads the electric charge generated by the photoelectric conversion unit by emitting a predetermined first amount of light from the light emitting unit, and reads an image of the document placed on the document placing surface based on the read electric charge. The detection processing unit reads the electric charge generated by the photoelectric conversion unit by emitting a second amount of light greater than the first amount of light from the light emitting unit and detects the size of the document placed on the document placing surface based on the read electric charge.

DETAILED DESCRIPTION

Embodiments of the present disclosure will be described below with reference to the accompanying drawings. The following embodiments are examples of embodying the present disclosure and are not intended to limit the technical scope of the present disclosure.

[Configuration of Image Forming Apparatus 10]

Figure 1:
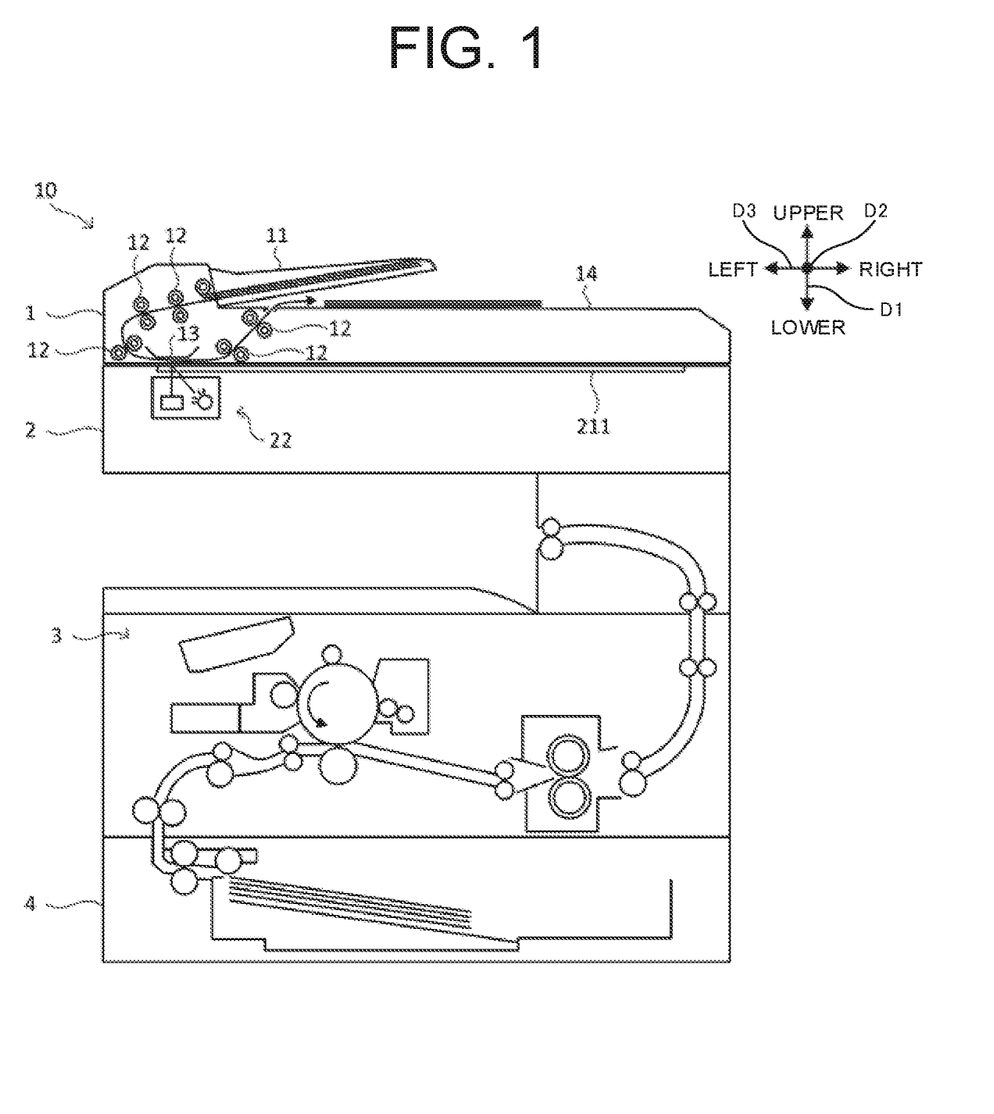
FIG. 1 is a diagram showing a configuration of an image forming apparatus according to an embodiment of the present disclosure.
Figure 2:
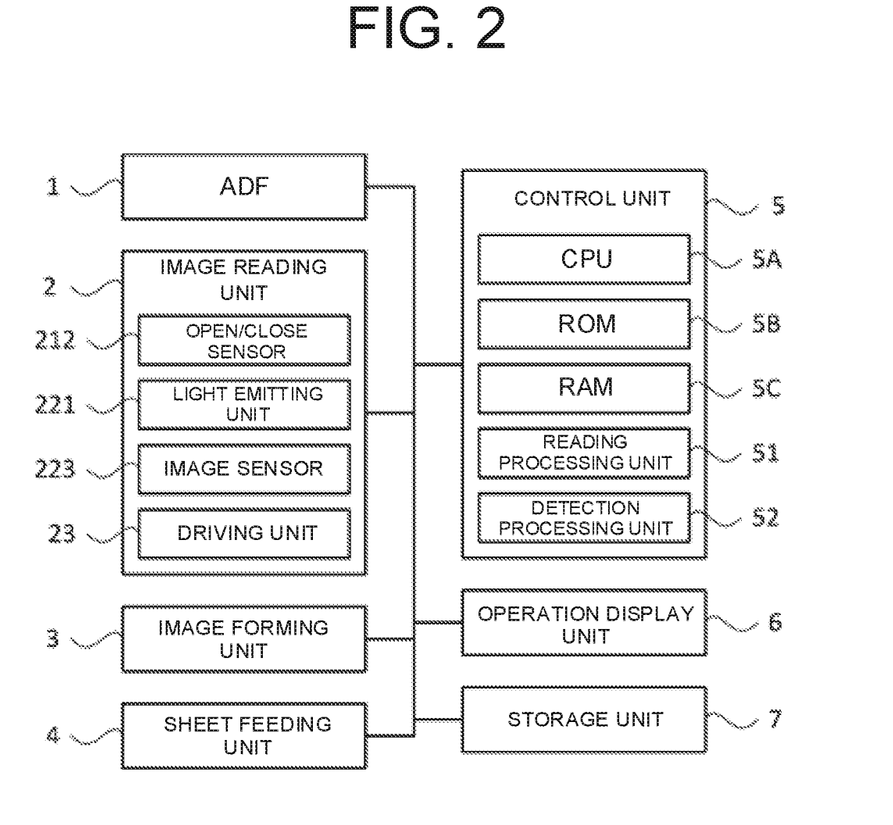
FIG. 2 is a block diagram showing a system configuration of the image forming apparatus.
Figure 3:
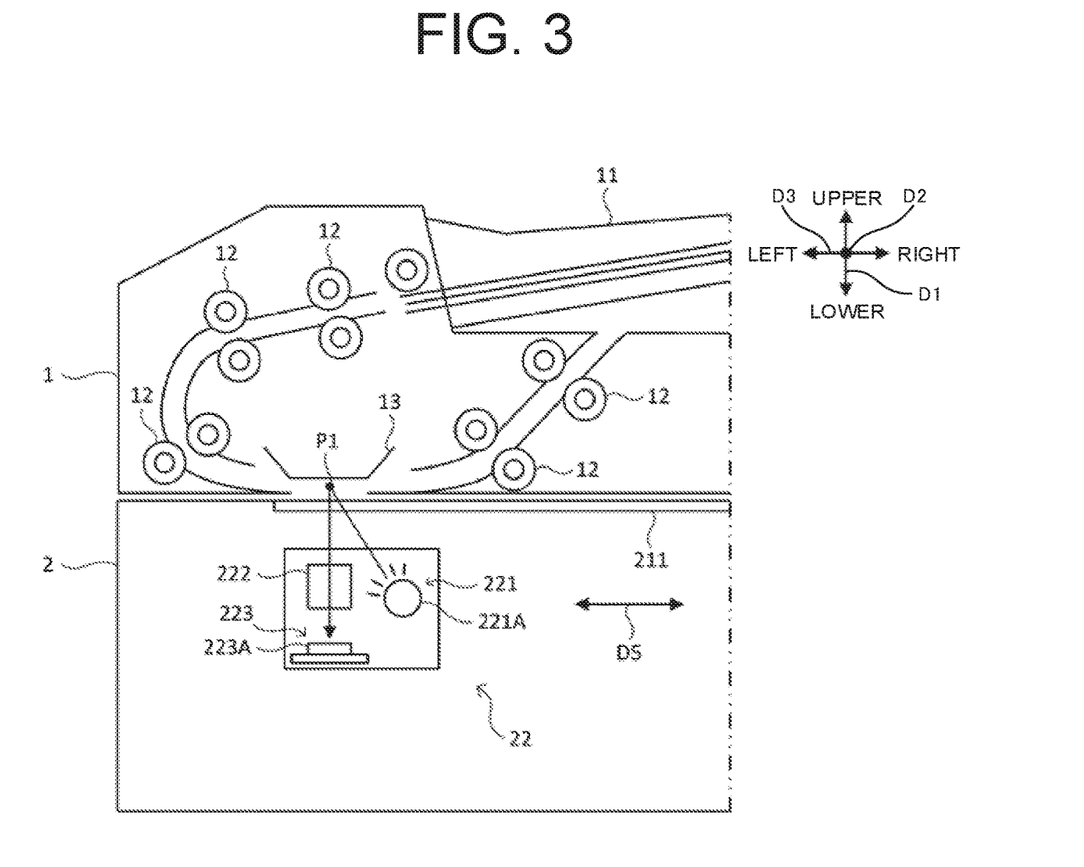
FIG. 3 is a diagram showing the configuration of an ADF and an image reading unit of the image forming apparatus.
Figure 4:
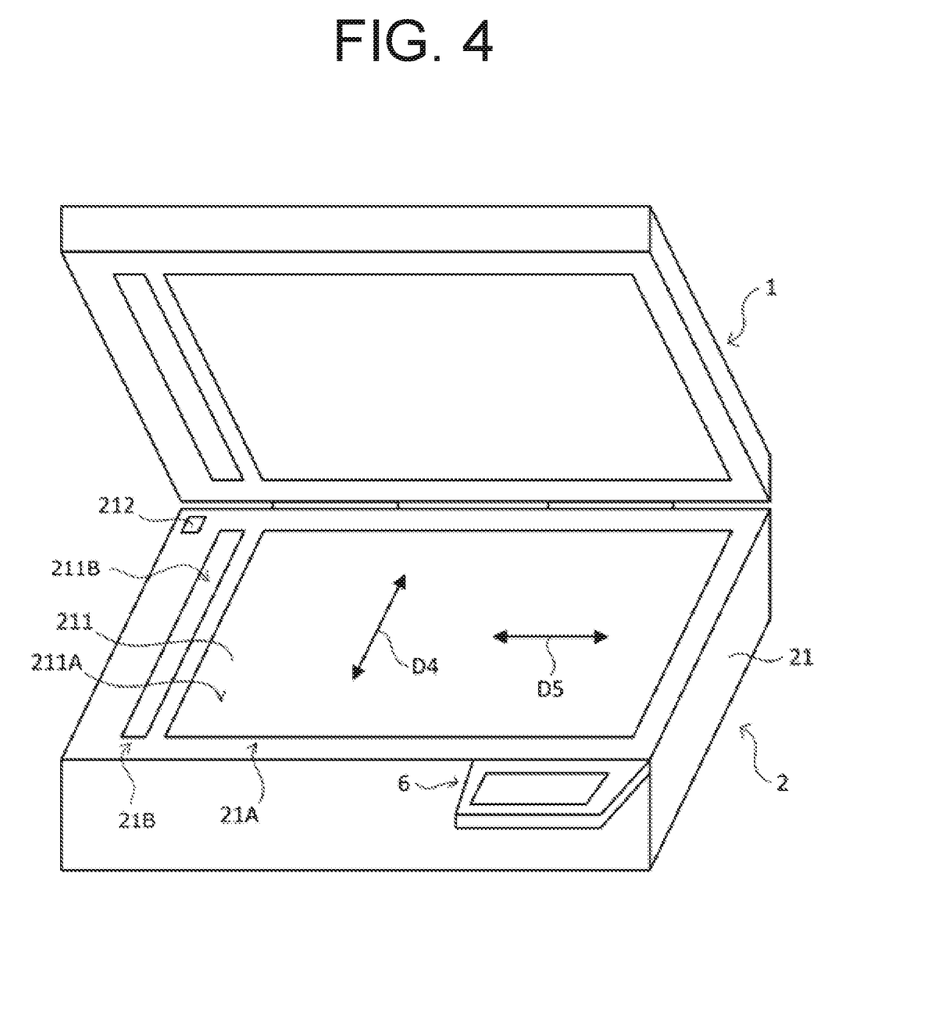
FIG. 4 is a diagram showing the configuration of the ADF and the image reading unit of the image forming apparatus.
Figure 5:
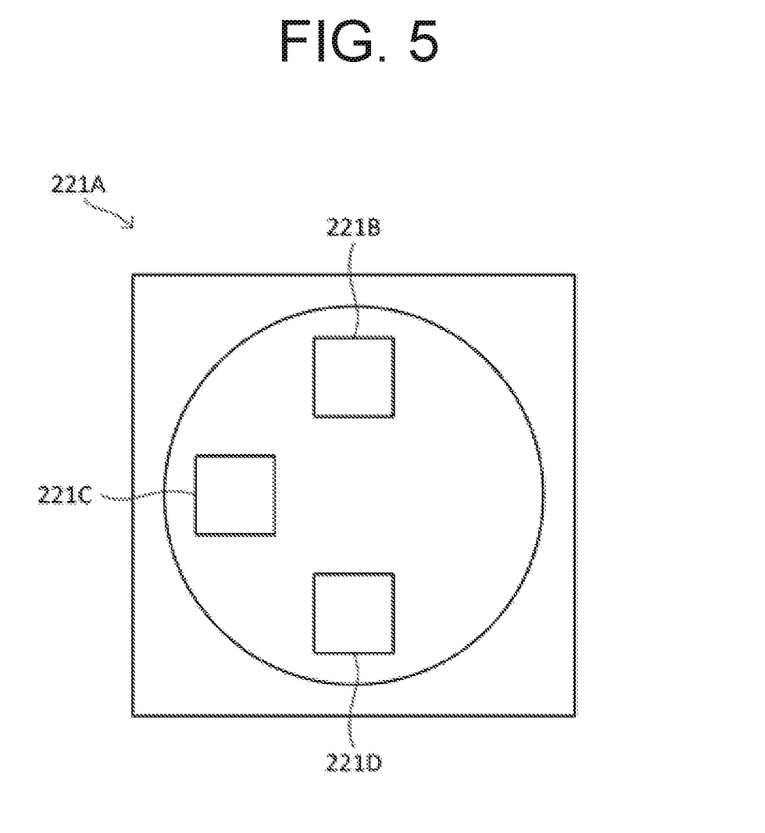
FIG. 5 is a view showing a configuration of a light source unit of the image forming apparatus.

First, the configuration of the image forming apparatus 10 according to the embodiment of the present disclosure will be described with reference to FIGS. 1 to 5. FIG. 1 is a cross-sectional view showing the configuration of the image forming apparatus 10. FIG. 3 is a cross-sectional view showing the configuration of an ADF 1 and an image reading unit 2. FIG. 4 is a perspective view showing the ADF 1 opened. FIG. 5 is a view showing the configuration of a light source unit 221A.

For convenience of explanation, the vertical direction in an installation state in which the image forming apparatus 10 can be used (the state shown in FIG. 1) is defined as the vertical direction D1, the front-back direction D2 is defined with the front surface (front) of the image forming apparatus 10 shown in FIG. 1 on the front side of a sheet, and the lateral direction D3 is defined with the front surface of the image forming apparatus 10 in the installation state as a reference.

The image forming apparatus 10 is a multifunction machine having a plurality of functions such as a facsimile function and a copy function in addition to a scanning function for reading image data from a document and a printing function for forming an image based on the image data. As shown in FIGS. 1 and 2, the image forming apparatus 10 includes an ADF (Automatic Document Feeder) 1, an image reading unit 2, an image forming unit 3, a sheet feeding unit 4, a control unit 5, an operation display unit 6, and a storage unit 7.

The ADF 1 conveys a document to be read by the image reading unit 2. As shown in FIGS. 1 and 3, the ADF 1 includes a document placing unit 11, a plurality of conveying rollers 12, a document guide 13, and a sheet discharge unit 14. In the ADF 1, documents are taken out one by one from the document placing unit 11, and the taken out documents are conveyed to the sheet discharge unit 14 via an image reading position P1 (see FIG. 3) by the image reading unit 2.

The image reading unit 2 can read image data from a document. Specifically, the image reading unit 2 can read image data from a document by a CIS (contact image sensor) method. As shown in FIGS. 1 to 4, the image reading unit 2 includes a housing 21, a reading unit 22, and a driving unit 23.

The housing 21 accommodates components of the image reading unit 2. As shown in FIG. 4, the housing 21 is formed in a flat box shape. A rectangular opening 21A is provided at the center of an upper surface of the housing 21, and a rectangular opening 21B is provided at the left side of the upper surface. The openings 21A and 21B are closed by a contact glass 211 mounted under the openings 21A and 21B. An exposed area of the contact glass 211 exposed from the opening 21A is used as a document placing surface 211A (see FIG. 4) on which a document to be read is placed, and an exposed area exposed from the opening 21B is used as a document conveying surface 211B (see FIG. 4) on which the document to be read is conveyed by the ADF 1. The contact glass 211 is an example of a light transmitting member in the present disclosure.

As shown in FIG. 4, the ADF 1 is mounted on the upper surface of the housing 21 so as to be openable and closable with respect to the document placing surface 211A. Thus, the ADF 1 functions as a document cover for a document placed on the document placing surface 211A.

As shown in FIG. 4, an open/close sensor 212 is provided on the upper surface of the housing 21. The open/close sensor 212 detects a state transition between an open state and a closed state of the ADF 1. For example, the open/close sensor 212 is a reflective photosensor.

The reading unit 22 is used for reading image data from a document. As shown in FIG. 3, the reading unit 22 is provided under the contact glass 211. As shown in FIG. 3, the reading unit 22 includes a light emitting unit 221, a lens 222, and an image sensor 223.

The light emitting unit 221 emits light onto a document placed on the document placing surface 211A. For example, the light emitting unit 221 is composed of a light guide member long in a main scanning direction D4 (see FIG. 4) parallel to the front-back direction D2 and the light source unit 221A. The light source unit 221A is the light emitting device capable of selectively emitting light of a plurality of colors. As shown in FIG. 5, the light source unit 221A includes a first light source 221B for emitting red light, a second light source 221C for emitting green light, and a third light source 221D for emitting blue light. For example, the first light source 221B, the second light source 221C, and the third light source 221D are light emitting diodes. The light emitting unit 221 may be composed of a plurality of light source units 221A arranged along the main scanning direction D4.

The lens 222 collects the light emitted from the light emitting unit 221 and reflected by the document onto a photodiode 223A (see FIG. 3) of the image sensor 223. The lens 222 is formed long in the main scanning direction D4. For example, the lens 222 is a rod lens array.

The image sensor 223 outputs image data based on the light emitted from the light emitting unit 221 and reflected by the document. For example, the image sensor 223 is a CMOS image sensor. The image sensor 223 includes a plurality of photodiodes 223A (see FIG. 3) arranged along the main scanning direction D4. The photodiodes 223A are provided so as to be capable of receiving the light emitted from the light emitting unit 221 and reflected by the document, and generate electric charge corresponding to the received light. The image sensor 223 reads electric charge generated by the photodiodes 223A from the photodiodes 223A as analog electric signals for each preset reading interval. The read analog electric signals are converted into digital electric signals (image data) and output to the control unit 5. The image sensor 223 is an example of a photoelectric conversion unit in the present disclosure.

The reading unit 22 is supported by the casing 21 so as to be movable in the sub scanning direction D5 (see FIGS. 3 and 4) parallel to the document placing surface 211A and perpendicular to the main scanning direction D4. The reading unit 22 is moved in the sub scanning direction D5 by receiving a driving force supplied from the driving unit 23. As a result, the reading position of the image data on the document placing surface 211A by the reading unit 22 is moved in the sub scanning direction D5.

The driving unit 23 generates a driving force for moving the reading unit 22 in the housing 21. For example, the driving unit 23 is a stepping motor.

The image forming unit 3 can form an image on the sheet by an electrophotographic method based on the image data read by the image reading unit 2. The image forming unit 3 includes a photosensitive drum, a charging device, an optical scanning device, a developing device, a transfer device, a cleaning device, a fixing device, and a discharge tray. The image forming unit 3 may form an image by another image forming method such as an ink jet method.

The sheet feeding unit 4 supplies sheets to the image forming unit 3. The sheet feeding unit 4 includes a sheet feeding cassette, a sheet conveying path, and a plurality of conveying rollers. The image forming unit 3 forms an image based on the image data on the sheet supplied from the sheet feeding unit 4.

The control unit 5 generally controls the image forming apparatus 10. As shown in FIG. 2, the control unit 5 includes a CPU 5A, a ROM 5B, and a RAM 5C. The CPU 5A is a processor for executing various kinds of arithmetic process. The ROM 5B is a nonvolatile storage device in which information such as a control program for causing the CPU 5A to execute various kinds of processing is stored in advance. The RAM 5C is a volatile storage device used as a temporary storage memory (work area) for various kinds of processing executed by the CPU 5A. The control unit 5 may be constituted by an electronic circuit such as an integrated circuit (ASIC). The control unit 5 may be provided separately from the main control unit for generally controlling the image forming apparatus 10.

The operation display unit 6 is a user interface of the image forming apparatus 10. The operation display unit 6 includes a display unit such as a liquid crystal display and an operation unit such as an operation key or a touch panel.

The storage unit 7 is a nonvolatile storage device. For example, the storage unit 7 is a storage device such as a flash memory, a nonvolatile memory such as an EEPROM (registered trademark), a solid state drive (SSD), and a hard disk drive (HDD).

The image reading apparatus capable of detecting a size of the document placed on the contact glass 211 is known. Specifically, in this image reading apparatus, image data is read from the document placed on the contact glass 211 immediately before the ADF1 is closed, and the size of the document is detected based on the read image data.

Here, when the image data for size detection is read from the document placed on the contact glass 211, ambient light such as sunlight or electric lamp light may enter the image sensor 223 from an exposed area of the contact glass 211 not covered by the document, or the ambient light transmitted through the document may enter the image sensor 223. In this case, the boundary between the document area and the exposed area in the read image data may become unclear, and the detection accuracy of the document size may decrease.

On the other hand, in the image forming apparatus 10 according to the embodiment of the present disclosure, as will be described below, it is possible to suppress a decrease in the detection accuracy of the document size due to the ambient light incident on the contact glass 211.

Specifically, the ROM 5B of the control unit 5 stores in advance a reading control program for causing the CPU 5A to execute a reading control process (see the flowchart of FIG. 6) to be described later. The reading control program is recorded on a computer-readable recording medium such as a CD, a DVD, or a flash memory, and may be read from the recording medium and installed in the storage unit 7.

As shown in FIG. 2, the control unit 5 includes a reading processing unit 51 and a detection processing unit 52. Specifically, the control unit 5 executes the reading control program stored in the ROM 5B using the CPU 5A. Thus, the control unit 5 functions as the reading processing unit 51 and the detection processing unit 52. Here, an apparatus including the image reading unit 2 and the control unit 5 is an example of the image reading apparatus in the present disclosure. The present disclosure is applicable to the image reading apparatus or the image forming apparatus such as a scanner apparatus, a facsimile apparatus, and a copying machine.

The reading processing unit 51 executes reading process for reading the image of the document placed on the document placing surface 211A using the image reading unit 2.

Specifically, the reading process includes the following first control process, second control process, and storage process.

The first control process is a process of moving the reading unit 22 and emitting a predetermined first light amount of light from the light emitting unit 221. Specifically, in the first control process, the driving of the driving unit 23 is controlled, and the reading unit 22 is moved in the sub scanning direction D5 at a predetermined reading speed. In the first control process, the first light source 221B, the second light source 221C, and the third light source 221D are sequentially turned on during a reading period in which the reading unit 22 reads an image of one pixel of the document, in other words, during a period in which the reading unit 22 moves a distance of one pixel. Specifically, in the first control process, the light emitting source is switched at a first interval of one-third of the reading period. Thus, the image of one pixel to be read is sequentially irradiated with light of three colors of RGB. In the first control process, electric power supplied to the first light source 221B, the second light source 221C, and the third light source 221D is controlled, and light of the first light amount is emitted from the first light source 221B, the second light source 221C, and the third light source 221D. The amount of light emitted from the first light source 221B, the second light source 221C, and the third light source 221D may be individually set within the range of the first light amount or less.

The second control process is a process of reading the electric charge generated by the photodiode 223A at the first interval. Specifically, the control unit 5 inputs a control signal to the image sensor 223 and sets the reading interval to the first interval. For example, the control unit 5 inputs a clock signal having a clock cycle of the first interval to the image sensor 223 to operate the image sensor 223 at the clock cycle. Thus, in the image sensor 223, the electric charge generated by the photodiodes 223A are read out from each of the photodiodes 223A at the first interval, and image data of a single color based on the read electric charge is output in the order of RGB.

The storage process is a process of executing predetermined image process on the image data input from the image sensor 223 and storing the image data after the image process in the storage unit 7.

The detection processing unit 52 executes detection process for detecting the size of the document placed on the document placing surface 211A using the image reading unit 2.

Specifically, the detection process includes the following third control process, fourth control process, and identification process.

The third control process is a process of causing the light emitting unit 221 to emit light having a second light amount greater than the first light amount. Specifically, in the third control process, the first light source 221B and the second light source 221C are turned on simultaneously. In the third control process, electric power supplied to the first light source 221B and the second light source 221C is controlled, and light of the first light amount is emitted from the first light source 221B and the second light source 221C. That is, the second light amount is twice as much as the first light amount.

The fourth control process is a process of reading the electric charge generated by the photodiode 223A at a second interval shorter than the first interval. For example, the second interval is an interval obtained by multiplying the first interval by the ratio of the first light amount to the second light amount, that is, an interval of one-half of the first interval. Specifically, the control unit 5 inputs a control signal to the image sensor 223 and sets the reading interval to the second interval. Thus, the image sensor 223 reads the electric charge generated by the photodiode 223A from each of the photodiodes 223A at the second interval, and outputs image data based on the read electric charge.

The identification process is a process of identifying the size of the document based on the image data input from the image sensor 223. Specifically, in the identification process, an edge of the document placed on the document placing surface 211A in the main scanning direction D4 is detected based on the image data input from the image sensor 223. For example, it is determined that the edge of the document is a pixel position where the density difference from the pixel adjacent to the main scanning direction D4 in the image data input from the image sensor 223 exceeds a predetermined threshold value. The size of the document is identified based on the detected distance between the edges.

In the third control process, the first light source 221B, the second light source 221C, and the third light source 221D may be turned on at the same time. In the third control process, any one of the first light source 221B, the second light source 221C, and the third light source 221D may emit second light amount. In the fourth control process, the second interval may be different from an interval obtained by multiplying the first interval by the ratio of the first light amount to the second light amount.

[Reading Control Process]

Figure 6:
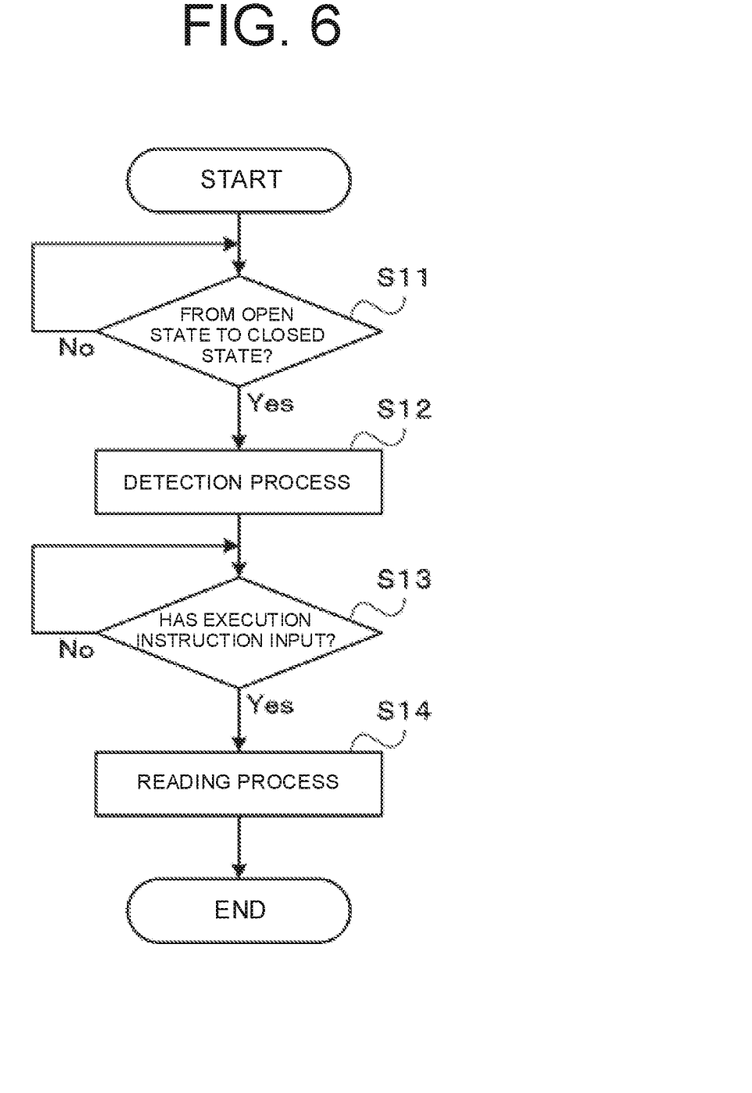
FIG. 6 is a flowchart showing an example of reading control process executed by the image forming apparatus.

Hereinafter, with reference to FIG. 6, a document size detection method according to the present disclosure will be described together with an example of a procedure of the reading control process executed by the control unit 5 in the image forming apparatus 10. Here, steps S11, S12, . . . represent numbers of processing procedures (steps) executed by the control unit 5. The reading control process is executed when the open/close sensor 212 detects a state transition of the ADF 1 from the open state to the closed state.

<Step S11>

First, in step S11, the control unit 5 determines whether or not the open/close sensor 212 has detected a state transition of the ADF 1 from the open state to the closed state.

If the control unit 5 determines that the open/close sensor 212 has detected the state transition of the ADF 1 from the open state to the closed state (Yes side in S11), the control unit 5 shifts the process to step S12. If the open/close sensor 212 has not detected the state transition of the ADF 1 from the open state to the closed state (No side in S11), the control unit 5 waits for the open/close sensor 212 to detect the state transition of the ADF 1 from the open state to the closed state in step S11.

<Step S12>

In step S12, the control unit 5 executes the detection process. The process in step S12 is an example of a detection step in the present disclosure.

<Step S13>

In step S13, the control unit 5 determines whether or not an instruction to execute the reading process has been input by a user operation on the operation display unit 6.

If the control unit 5 determines that the execution instruction of the reading process has been input (Yes side in S13), the control unit 5 shifts the process to step S14. If the execution instruction of the reading process has not been input (No side in S13), the control unit 5 waits for the input of the execution instruction of the reading process in step S13.

<Step S14>

In step S14, the control unit 5 executes the reading process. The process in step S14 is an example of a reading step in the present disclosure.

The detection result of the size of the document in step S12 is used, for example, in trimming process for the image data of the document read in step S14.

As described above, in the image forming apparatus 10, when the detection process in which the reading unit 22 does not need to be moved is executed, the reading interval is set to the second interval which is shorter than the first interval. That is, in the image forming apparatus 10, by switching the reading interval when the detection process is executed, it is possible to read the electric charge from the photodiode 223A at an interval which is shorter than the interval (the first interval) corresponding to the moving speed of the reading unit 22. In addition, in the image forming apparatus 10, the amount of light emitted from the light emitting unit 221 in the detection process is controlled to the second light amount which is larger than the amount of light emitted in the reading process. Thus, it is possible to suppress the influence of the ambient light on the density of the pixels included in the image data read in the detection process without causing the saturation of the electric charge generated in the photodiode 223A. Therefore, it is possible to suppress the boundary between the document area and the exposure area from becoming unclear in the image data read in the detection processing, and to suppress the decrease in the detection accuracy of the document size. It is possible to control to the second light amount at the first interval as the reading interval, as long as the saturation of the electric charge is not caused.

The light source unit 221A may include only one white light source instead of the first light source 221B, the second light source 221C, and the third light source 221D. In this case, the current supplied to the white light source may be controlled so that the amount of light emitted from the white light source may be switched between the first light amount and the second light amount.

Figure 7:
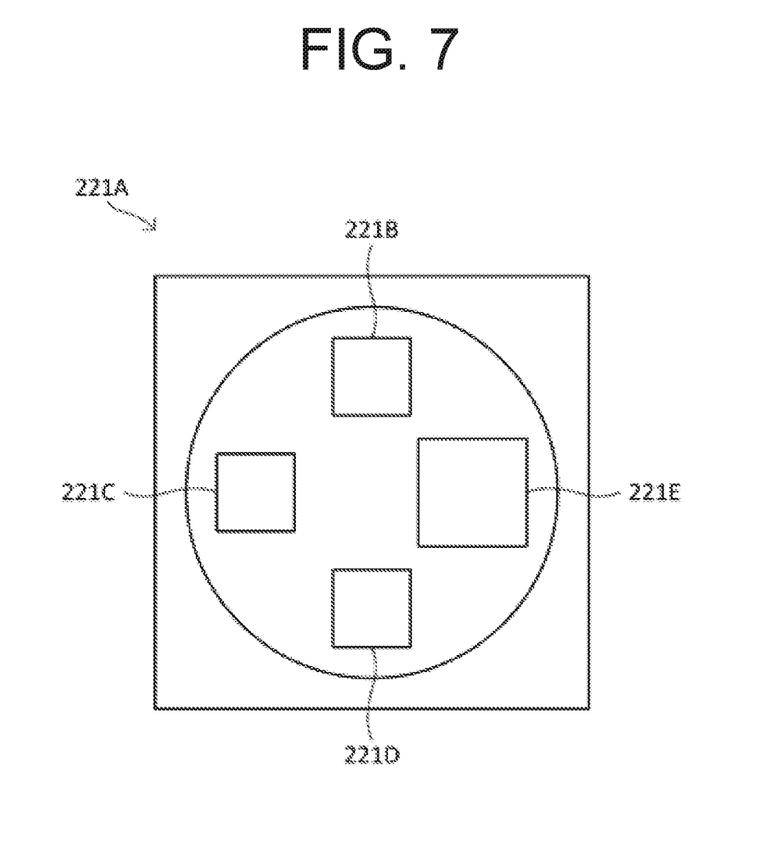
FIG. 7 is a view showing a configuration of the light source unit of the image forming apparatus according to another embodiment of the present disclosure.

As shown in FIG. 7, the light source unit 221A may include a fourth light source 221E in addition to the first light source 221B, the second light source 221C, and the third light source 221D. In this case, the first light amount may be sequentially emitted from the first light source 221B, the second light source 221C, and the third light source 221D in the first control process, and the second light amount may be emitted from the fourth light source 221E in the second control process. For example, the fourth light source 221E is a light emitting diode having a chip size larger than that of the first light source 221B, the second light source 221C, and the third light source 221D, and when the same current is supplied, the amount of light emitted from the fourth light source 221E is larger than that of the first light source 221B, the second light source 221C, and the third light source 221D. As shown in FIG. 7, the fourth light source 221E is integrally formed with the first light source 221B, the second light source 221C, and the third light source 221D, whereby it is possible to suppress an increase in the storage space of the light source unit 221A in the reading unit 22. The light emitting unit 221 may include a light source unit different from the light source unit 221A, and the fourth light source 221E may be included in the different light source unit.

The image reading unit 2 may read image information from the document by a CCD (charge-coupled device) system.

What is claimed is:

1. An image reading apparatus comprising:
   a light transmitting member having a document placing surface on which a document is placed;
   a light emitting unit which is provided on a lower side of the light transmitting member so as to be movable along the document placing surface and emits light to the document placed on the document placing surface;
   a photoelectric conversion unit which is provided so as to be capable of receiving light emitted from the light emitting unit and reflected by the document placed on the document placing surface, and generates electric charge corresponding to the received light;
   a reading processing unit that moves the light emitting unit and reads electric charge generated by the photoelectric conversion unit by emitting a predetermined first amount of light from the light emitting unit, and reads an image of the document placed on the document placing surface based on the read electric charge; and
   a detection processing unit that reads the electric charge generated by the photoelectric conversion unit by emitting light having a second light amount larger than the first light amount from the light emitting unit, and detects a size of the document placed on the document placing surface based on the read electric charge,
   wherein the reading processing unit reads the electric charge generated by the photoelectric conversion unit at a first interval, and wherein the detection processing unit reads the electric charge generated by the photoelectric conversion unit at a second interval shorter than the first interval.

2. The image reading apparatus according to claim 1,
   wherein the light emitting unit includes a first light source that emits red light, a second light source that emits green light, and a third light source that emits blue light,
   wherein the reading processing unit sequentially turns on the first light source, the second light source, and the third light source, and
   wherein the detection processing unit simultaneously turns on at least two of the first light source, the second light source, and the third light source.

3. The image reading apparatus according to claim 1,
wherein the light emitting unit includes a first light source that emits red light, a second light source that emits green light, a third light source that emits blue light, and a fourth light source that emits a greater amount of light than light emitted by the first light source, the second light source, and the third light source,
wherein the reading processing unit sequentially turns on the first light source, the second light source, and the third light source, and
wherein the detection processing unit turns on the fourth light source.

4. The image reading apparatus according to claim 3,
wherein the fourth light source is provided integrally with the first light source, the second light source, and the third light source.

* * * * *